United States Patent
Goswami et al.

(10) Patent No.: US 7,160,664 B1
(45) Date of Patent: Jan. 9, 2007

(54) MAGENTA DYE MIXTURE

(75) Inventors: Ramanuj Goswami, Webster, NY (US); Gary M. Russo, Webster, NY (US); William B. Vreeland, Webster, NY (US); Donald R. Diehl, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/315,416

(22) Filed: Dec. 22, 2005

(51) Int. Cl.
*B41M 5/26* (2006.01)
*B41M 5/035* (2006.01)
*C09B 67/00* (2006.01)
*G03C 8/10* (2006.01)

(52) U.S. Cl. .............. 430/201; 8/471; 8/638; 8/639; 428/32.6; 428/32.76; 503/227

(58) Field of Classification Search ............. 8/471, 8/638, 639; 430/201; 428/32.6, 32.76; 503/227
See application file for complete search history.

(56) References Cited

U.S. PATENT DOCUMENTS

| 4,839,336 A | 6/1989 | Evans et al. |
| RE33,819 E | 2/1992 | Moore et al. |
| 5,300,475 A | 4/1994 | Takuma et al. |
| 5,476,943 A | 12/1995 | Komamura et al. |
| 5,503,956 A * | 4/1996 | Kaszczuk et al. ........... 430/200 |
| 5,532,202 A | 7/1996 | Yoshida |
| 5,612,282 A | 3/1997 | Komamura et al. |
| 6,866,706 B1 | 3/2005 | Ishida et al. |

* cited by examiner

*Primary Examiner*—Richard L. Schilling
(74) *Attorney, Agent, or Firm*—Kathleen Neuner Manne

(57) ABSTRACT

A magenta dye combination having improved lightfastness and keeping properties is described, wherein the magenta dye combination can be used in thermal printing.

25 Claims, No Drawings

MAGENTA DYE MIXTURE

FIELD OF THE INVENTION

A combination of magenta dyes suitable for use in printing is presented.

BACKGROUND OF THE INVENTION

Thermal transfer systems have been developed to obtain prints from pictures that have been generated electronically, for example, from a color video camera or digital camera. An electronic picture can be subjected to color separation by color filters. The respective color-separated images can be converted into electrical signals. These signals can be operated on to produce cyan, magenta, and yellow electrical signals. These signals can be transmitted to a thermal printer. To obtain a print, a black, cyan, magenta, or yellow dye-donor layer, for example, can be placed face-to-face with a dye image-receiving layer of a receiver element to form a print assembly, which can be inserted between a thermal print head and a platen roller. A thermal print head can be used to apply heat from the back of the dye-donor sheet. The thermal print head can be heated up sequentially in response to the black, cyan, magenta, or yellow signals. The process can be repeated as needed to print all colors, and a laminate or protective layer, as desired. A color hard copy corresponding to the original picture can be obtained. Further details of this process and an apparatus for carrying it out are contained in U.S. Pat. No. 4,621,271 to Brownstein.

Thermal transfer works by transmitting heat through the donor from the backside to the dye-donor layer. When the dyes in the dye-donor layer are heated sufficiently, they sublime or diffuse, transferring to the adjacent dye-receiving layer of the receiver element. The density of the dye forming the image on the receiver can be affected by the amount of dye transferred, which in turn is affected by the amount of dye in the dye-donor layer, the heat the dye-donor layer attains, and the length of time for which the heat is maintained at any given spot on the donor layer.

At high printing speeds, considered to be 2.0 ms/line or less, the print head undergoes heat on/off cycles very rapidly. This generated heat must be driven through the dye donor support assemblage very rapidly to affect the dye transfer from the donor to the receiver. Each layer in the donor can act as an insulator, slowing down the heat transfer through the layers of the donor to the receiver. Because of the short heat application time, any reduction in heat transfer efficiency results in a lower effective temperature in the donor layer during printing, which can result in a lower transferred dye density. It is known to overcome the low print density associated with shorter line times by increasing the printhead voltage, increasing the dye density in the dye donor layer, or a combination thereof. Applying higher print head voltages can decrease the lifetime of the thermal print head, and requires a higher power supply, both of which increase cost. Increasing the dye density in the dye-donor layer increases costs, as well as increasing the chance of unwanted dye transfer, such as during storage of a dye-donor element.

Another problem exists with many of the dye-donor elements and receiver elements used in thermal dye transfer systems. During storage, the dyes can crystallize due to changes in temperature, humidity, or both. Crystallization of the dye can produce areas of non-uniformity in printing, resulting in dye-dropout from printed images.

Crystallization, light fade, and density of magenta dyes and dye combinations are known problems. Various dyes and dye combinations have been introduced in an attempt to produce a satisfactory printed color tone, while achieving sufficient print density at varying speeds, acceptable light fade, and an acceptable level of crystallinity. Examples of such dyes and dye combinations can be found in U.S. Pats. Nos. 4,839,336; 5,476,943; 5,532,202; 5,300,475; and Reissue 33,819. Similar dye structures can also be found in U.S. Pat. No. 6,866,706 B2.

There is still a need for magenta dye combinations that provide improved lightfastness, have improved keeping properties, are more efficient, or provide sufficient density when printing at various speeds, including high speeds of 2 ms or less per line.

SUMMARY OF THE INVENTION

A magenta dye combination, a thermal donor including the magenta dye combination, and a method of forming thermal prints using the donor are presented, wherein the magenta dye combination comprises at least a first magenta dye of the following structure I:

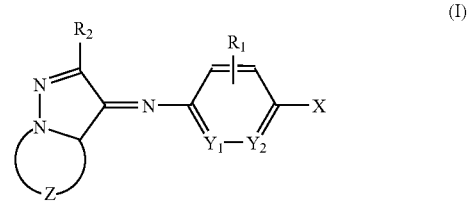

wherein X represents a $NR_3R_4$ group or a hydroxyl group, wherein $R_3$ and $R_4$ may be same or different and are independently selected from an alkyl, alkenyl, aryl, aralkyl, or cycloalkyl group; $Y_1$ and $Y_2$ each independently are selected from a carbon atom or a nitrogen atom, provided that one of $Y_1$ and $Y_2$ is a nitrogen atom; Z represents an atomic group necessary to form a 5- or 6-membered nitrogen-containing heterocyclic ring which may be condensed with another ring; and $R_1$ and $R_2$ are each independently selected from a hydrogen atom, halogen atom, alkyl, alkenyl, alkoxy, alkylamino, acetamido, sulfonamide, aryl, aralkyl, or cycloalkyl group;

and a second magenta dye of the structure II:

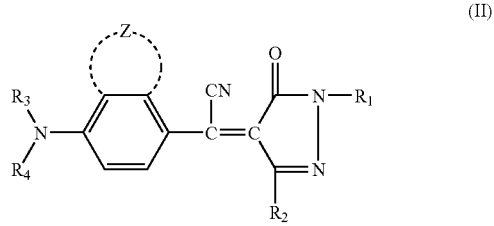

wherein:

$R_1$ represents an alkyl group having from 1 to 10 carbon atoms, a cycloalkyl group having from 5 to 7 carbon atoms, or an aryl group having from 6 to 10 carbon atoms;

$R_2$ represents an alkoxy group having from 1 to 10 carbon atoms, ann aryloxy group having from 6 to 10 carbon atoms, naphthoxy, $NHR_5$, $NR_5$, or $R_6$;

$R_3$ and $R_4$ are each independently $R_1$, or either or both of $R_3$ and $R_4$ can be joined to the carbon atom of the aromatic ring at a position ortho to the position of attachment of the anilino nitrogen to form a 5- or 6-membered ring, or $R_3$ and $R_4$ can be joined together to form a 5- or 6-membered heterocyclic ring with the nitrogen to which they are attached;

$R_5$ and $R_6$ each independently represents an alkyl group having from 1 to 10 carbon atoms, a cycloalkyl group having from 5 to 7 carbon atoms, or an aryl group having from 6 to 10 carbon atoms, or $R_5$ and $R_6$ may be joined together to form, along with the nitrogen to which they are attached, a 5- or 6-membered heterocyclic ring; and Z represents hydrogen or the atoms necessary to complete a 5- or 6-membered ring. Additional magenta dyes can be added to the composition.

Advantages

The magenta dye compositions described herein provide improved light stability and improved keeping properties, such as reduced or no crystallization. The magenta dye compositions further provide a more efficient dye composition, having a higher Dmax at certain voltage and line times.

DETAILED DESCRIPTION OF THE INVENTION

Magenta dye compositions are provided wherein the dye compositions have improved light stability, improved keeping properties such as reduced or no crystallization, or provide a more efficient dye composition having a higher Dmax at certain voltage and line times, such as fast printing times of 2 ms/line or less.

The magenta dye compositions have at least two magenta dyes, one of structure I and one of structure II, as described below. One or more additional magenta dyes as known in the art can be added to the composition. Exemplary magenta dyes that can be added without significantly affecting the dye composition properties are dyes of structure III or IV, described below.

A magenta dye of structure I can be included in the composition. One or more dyes of structure I can be included in a total amount of from 10 to 90% by weight of the composition, for example, from 15 to 90% by weight, or from 25 to 75% by weight of the composition. Structure I is as followings:

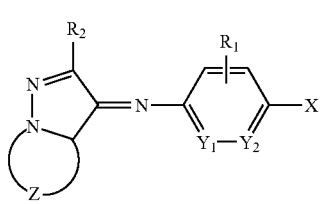

(I)

wherein X represents a $NR_3R_4$ group or a hydroxyl group, wherein $R_3$ and $R_4$ may be same or different and are independently selected from an alkyl, alkenyl, aryl, aralkyl, or cycloalkyl group; $Y_1$ and $Y_2$ each independently are selected from a carbon atom or a nitrogen atom, provided that one of $Y_1$ and $Y_2$ is a nitrogen atom; Z represents an atomic group necessary to form a 5- or 6-membered nitrogen-containing heterocyclic ring which may be condensed with another ring; and $R_1$ and $R_2$ are each independently selected from a hydrogen atom, halogen atom, alkyl, alk-enyl, alkoxy, alkylamino, acetamido, sulfonamide, aryl, aralkyl, or cycloalkyl group. According to certain embodiments, Structure I, $Y_1$ can be a carbon atom, $Y_2$ can be a nitrogen atom, X can be an $NR_3R_4$ group wherein $R_3$ and $R_4$ may be same or different alkyl, Z can be a 5-membered nitrogen-containing heterocyclic ring, $R_1$ can be a hydrogen or alkyl group, and $R_2$ can be an alkyl group.

The dye of structure I can be as follows:

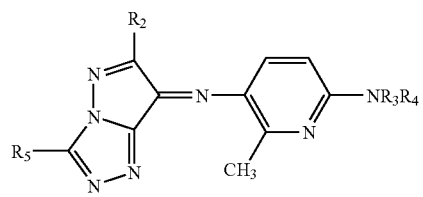

(Ia)

wherein $R_3$ and $R_4$ can be the same or different and are independently selected from an alkyl and an alkenyl; $R_2$ can be a $C_{1-6}$ alkyl; and $R_5$ can be a $C_{1-10}$ alkyl group, a $C_{5-7}$ cycloalkyl group, or a $C_{6-10}$ aryl group. According to certain embodiments, the dye of structure I can be as follows:

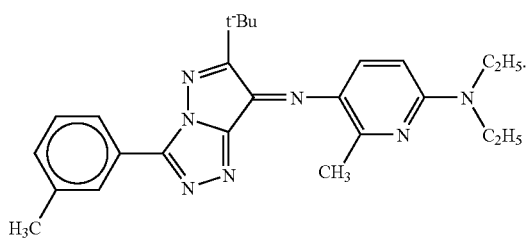

(Ib)

Methods of forming the dye of structures I, Ia and Ib are known in the art and can be found, for example, in U.S. Pats. Nos. 5,476,943 and 5,532,202.

A magenta dye of structure II can be included in the composition. One or more dyes of structure II can be included in a total amount of from 10 to 90% by weight of the composition, for example, from 10 to 85% by weight, or from 25 to 75% by weight of the composition. The magenta dye of structure II has the following formula:

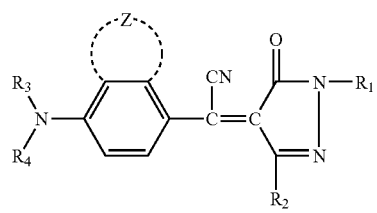

(II)

wherein:

$R_1$ represents an alkyl group having from 1 to 10 carbon atoms, a cycloalkyl group having from 5 to 7 carbon atoms, or an aryl group having from 6 to 10 carbon atoms;

$R_2$ represents an alkoxy group having from 1 to 10 carbon atoms, an aryloxy group having from 6 to 10 carbon atoms, naphthoxy, $NHR_5$ or $NR_5R_6$;

$R_3$ and $R_4$ are each independently $R_1$, or either or both of $R_3$ and $R_4$ can be joined to the carbon atom of the aromatic ring at a position ortho to the position of attachment of the anilino nitrogen to form a 5- or 6-membered ring, or $R_3$ and $R_4$ can be joined together to form a 5- or 6-membered heterocyclic ring with the nitrogen to which they are attached;

$R_5$ and $R_6$ each independently represents an alkyl group having from 1 to 10 carbon atoms, a cycloalkyl group having from 5 to 7 carbon atoms, or an aryl group having from 6 to 10 carbon atoms, or $R_5$ and $R_6$ may be joined together to form, along with the nitrogen to which they are attached, a 5- or 6-membered heterocyclic ring; and Z represents hydrogen or the atoms necessary to complete a 5- or 6-membered ring.

According to certain embodiments, in structure II, $R_1$ can be phenyl or methyl; $R_3$ and $R_4$ can each independently be selected from methyl or ethyl; and $R_2$ can be $NR_5R_6$, wherein each of $R_5$ and $R_6$ is independently selected from methyl or ethyl. According to certain embodiments, structure II can be as follows:

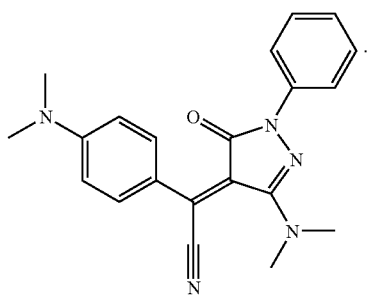

(IIa)

The magenta dye combination can be a combination of structure Ib and structure IIa.

Additional magenta dyes as known in the art can be added to the magenta dye combination including magenta dyes of structures I and II. For example, known magenta dyes include MS Red G (Disperse Red 60, manufactured by Mitsui Toatsu Chemicals, Inc.), Macrolex Violet R (Disperse Violet 26, manufactured by Bayer), and dyes of Structures II and IV<shown below. Exemplary additional dyes can include dyes of structure III below, dyes of structure IV below, or combinations thereof.

Dyes of structure III are as follows:

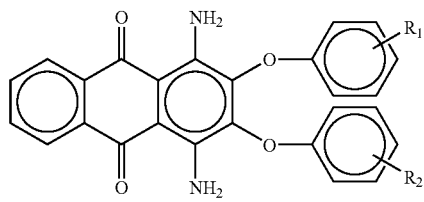

(III)

wherein $R_1$ and $R_2$ are each independently selected from hydrogen, hydroxyl, halogen, $C_{1-4}$ alkyl, or $C_{1-4}$ alkoxy.

According to certain embodiments, $R_1$ and $R_2$ can be hydrogen, producing the dye of structure IIIa:

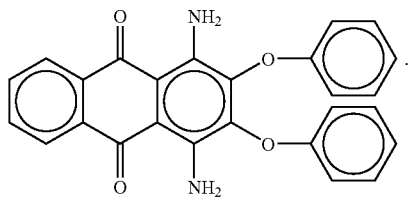

(IIIa)

Dyes of structure IV are as follows:

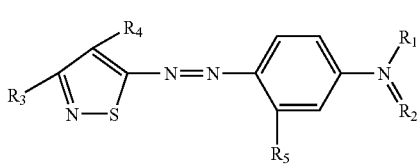

(IV)

wherein $R_1$ and $R_2$ are each independently hydrogen, $C_{1-6}$ alkyl or allyl, $C_{5-7}$ cycloalkyl, $C_{5-10}$ aryl, or $R_1$ and $R_2$ can be taken together to form a 5- or 6-membered heterocyclic ring which can include the nitrogen to which $R_1$ or $R_2$ is attached, and either carbon atom ortho to the carbon attached to the nitrogen atom;

$R_3$ is a hydrogen, $C_{1-6}$ alkyl, $C_{5-10}$ aryl, alkylthio, or halogen;

$R_4$ is cyano, thiocyanato, alkylthio, or alkoxycarbonyl; and $R_5$ is a $C_{1-6}$ alkyl, a $C_{5-10}$ aryl, or NHA, where A is an acyl or sulfonyl radical. Exemplary dyes of structure IV include:

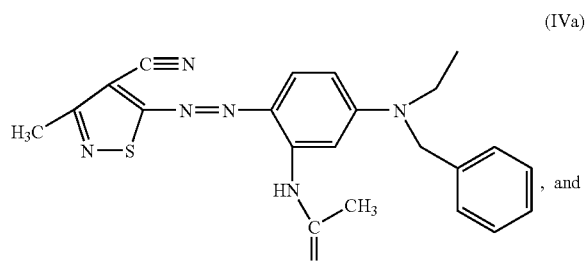

(IVa)

, and

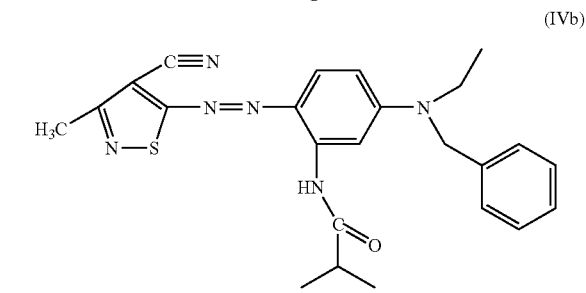

(IVb)

The magenta dye combinations as described herein can be used in a dye-donor layer of a thermal dye-donor element to form images by thermal printing. The dye-donor layer can include the magenta dye combination alone, or multiple colored areas (patches) containing dyes suitable for thermal printing. As used herein, a "dye" can be one or more dye, pigment, colorant, or a combination thereof, and can optionally be in a binder or carrier as known to practitioners in the art.

During thermal printing, at least a portion of one or more colored areas can be transferred from the dye-donor layer of the dye-donor element to a receiver element, forming a colored image on the receiver element. The dye-donor layer can include a laminate area (patch) having no dye. The laminate area can follow one or more colored areas on the dye-door element. During thermal printing, the entire laminate area can be transferred to the receiver element. The dye-donor layer can include one or more colored areas and one or more laminate areas. For example, the dye-donor layer can include three color patches, for example, yellow, magenta, and cyan, and a clear laminate patch, for forming a three color image with a protective laminate layer on the receiver element.

Any dye transferable by heat can be used in the dye-donor layer of the dye-donor element. The dye can be selected by taking into consideration hue, lightfastness, and solubility of the dye in the dye donor layer binder and the dye image receiving layer binder. Suitable magenta dye combinations are discussed above.

Examples of further suitable dyes, including further magenta, yellow, and cyan dyes, can include, but are not limited to, diarylmethane dyes; triarylmethane dyes; thiazole dyes, such as 5-arylisothiazole azo dyes; methine dyes such as merocyanine dyes, for example, aminopyrazolone merocyanine dyes; azomethine dyes such as indoaniline, acetophenoneazomethine, pyrazoloazomethine, imidazoleazomethine, imidazoazomethine, pyridoneazomethine, and tricyanopropene azomethine dyes; xanthene dyes; oxazine dyes; cyanomethylene dyes such as dicyanostyrene and tricyanostyrene dyes; thiazine dyes; azine dyes; acridine dyes; azo dyes such as benzeneazo, pyridoneazo, thiopheneazo, isothiazoleazo, pyrroleazo, pyrraleazo, imidazoleazo, thiadiazoleazo, triazoleazo, and disazo dyes; arylidene dyes such as alpha-cyano arylidene pyrazolone and aminopyrazolone arylidene dyes; spiropyran dyes; indolinospiropyran dyes; fluoran dyes; rhodaminelactam dyes; naphthoquinone dyes, such as 2-carbamoyl-4-[N-(p-substituted aminoaryl) imino]-1,4-naphthaquinone; anthraquinone dyes; and quinophthalone dyes. Specific examples of dyes usable herein can include:

C.I. (color index) Disperse Yellow 51, 3, 54, 79, 60, 23, 7, and 141;

C.I. Disperse Blue 24, 56, 14, 301, 334, 165, 19, 72, 87, 287, 154, 26, and 354;

C.I. Disperse Red 135, 146, 59, 1, 73, 60, and 167;

C.I. Disperse Orange 149;

C.I. Disperse Violet 4, 13, 26, 36, 56, and 31;

C.I. Disperse Yellow 56, 14, 16, 29, 201 and 231;

C.I. Solvent Blue 70, 35, 63, 36, 50, 49, 111, 105, 97, and 11;

C.I. Solvent Red 135, 81, 18, 25, 19, 23, 24, 143, 146, and 182;

C.I. Solvent Violet 13;

C.I. Solvent Black 3;

C.I. Solvent Yellow 93; and

C.I. Solvent Green 3.

Further examples of sublimable or diffusible dyes that can be used include anthraquinone dyes, such as Sumikalon Violet RS® (product of Sumitomo Chemical Co., Ltd.), Dianix Fast Violet 3R-FS® (product of Mitsubishi Chemical Corporation.), and Kayalon Polyol Brilliant Blue N-BGM® and KST Black 146® (products of Nippon Kayaku Co., Ltd.); azo dyes such as Kayalon Polyol Brilliant Blue BM®, Kayalon Polyol Dark Blue 2BM®, and KST Black KR® (products of Nippon Kayaku Co., Ltd.), Sumickaron Diazo Black 5G® (product of Sumitomo Chemical Co., Ltd.), and Miktazol Black 5 GH® (product of Mitsui Toatsu Chemicals, Inc.); direct dyes such as Direct Dark Green B® (product of Mitsubishi Chemical Corporation) and Direct Brown M® and Direct Fast Black D® (products of Nippon Kayaku Co. Ltd.); acid dyes such as Kayanol Milling Cyanine 5R® (product of Nippon Kayaku Co. Ltd.); and basic dyes such as Sumicacryl Blue 6G® (product of Sumitomo Chemical Co., Ltd.), and Aizen Malachite Green® (product of Hodogaya Chemical Co., Ltd.).

Other suitable cyan dyes can include Kayaset Blue 714 (Solvent Blue 63, manufactured by Nippon Kayaku Co., Ltd.), Phorone Brilliant Blue S-R (Disperse Blue 354, manufactured by Sandoz K. K.), Waxoline AP-FW (Solvent Blue 36, manufactured by ICI), and cyan dyes of the structures

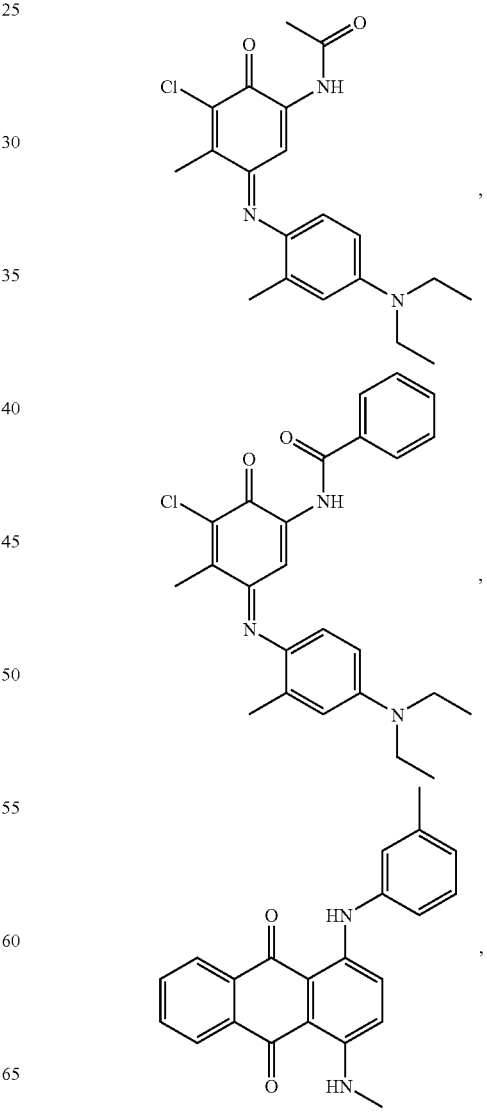

-continued

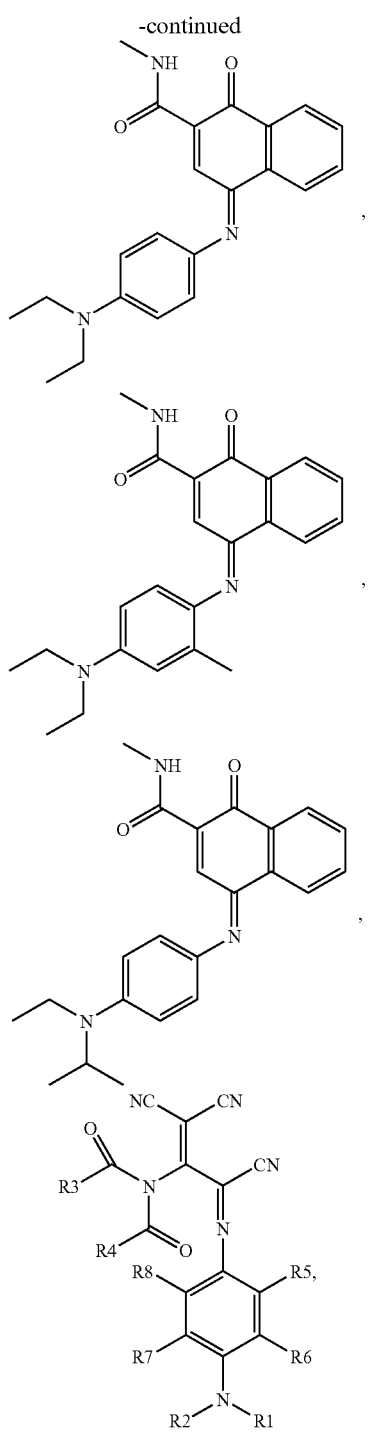

where R1 and R2 each independently represents an alkyl group, a cycloalkyl group, an aryl group, a heterocyclic group, or R1 and R2 together represent the necessary atoms to close a heterocyclic ring, or R1 and/or R2 together with R6 and/or R7 represent the necessary atoms to close a heterocyclic ring fused on the benzene ring; R3 and R4 each independently represents an alkyl group, or an alkoxy group; R5, R6, R7 and R8 each independently represents hydrogen, an alkyl group, a cycloalkyl group, an aryl group, an alkoxy group, an aryloxy group, a carbonamido group, a sulfamido group, hydroxy, halogen, $NHSO_2R_9$, $NHCOR_9$, $OSO_2R_9$, or $OCOR_9$, or R5 and R6 together and/or R7 and R8 together represent the necessary atoms to close one or more heterocyclic ring fused on the benzene ring, or R6 and/or R7 together with R1 and/or R2 represent the necessary atoms to close a heterocyclic ring fused on the benzene ring; and R9 represents an alkyl group, a cycloalkyl group, an aryl group and a heterocyclic group.

Other suitable yellow dyes can include Phorone Brilliant Yellow S-6 GL (Disperse Yellow 231, manufactured by Sandoz K. K.) and Macrolex Yellow 6G (Disperse Yellow 201, manufactured by Bayer), and yellow dyes of the structures

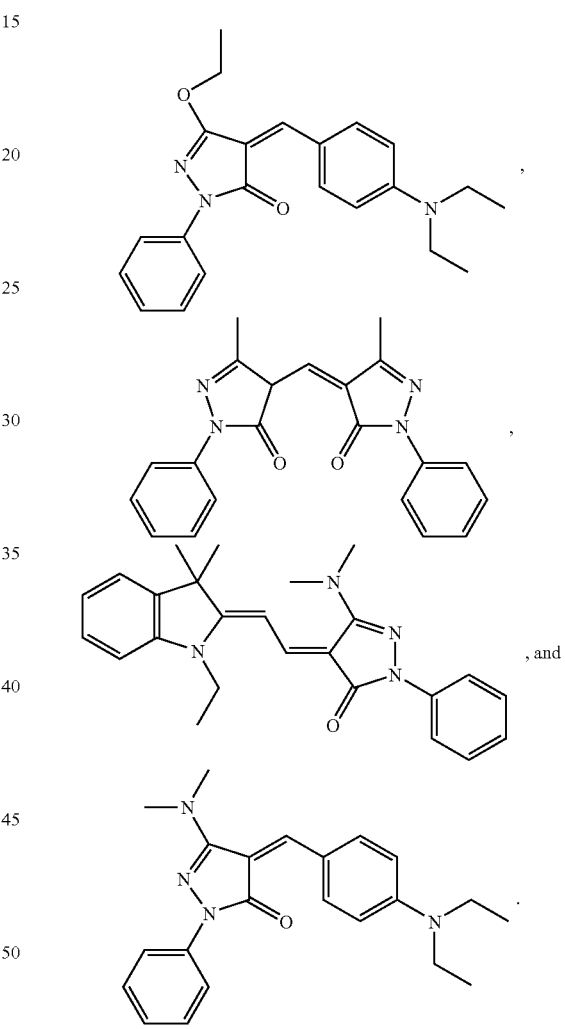

Further examples of useful dyes can be found in U.S. Pat. Nos. 4,541,830; 4,698,651; 4,695,287; 4,701,439; 4,757,046; 4,743,582; 4,769,360; 4,753,922; 5,026,677; 5,101,035; 5,142,089; 5,804,531; and 6,265,345, and U.S. Patent Application Publication No. US 2003/0181331.

The dyes can be employed singly or in combination to obtain a monochrome dye-donor layer or a black dye-donor layer. The dyes can be used in an amount of from 0.05 g/m² to 1 g/m² of coverage. According to various embodiments, the dyes can be hydrophobic.

Each dye-donor layer patch can range from 20 wt. % to 90 wt. % dye, relative to the total dry weight of all components in the layer. A high amount of dye is desirable for increased efficiency, but higher amounts of dye can lead to increased occurrences of donor/receiver sticking. Depending on the efficiency of the dye-donor layer, a lower amount of dye can be used to achieve the same efficiency as a different dye-donor layer. The dye percent is ideally chosen in view of the specific donor and receiver combination. Varying the amount of dye in the donor can aid in matching the efficiency between different dye patches, for example, a cyan, magenta, and yellow patch. For example, yellow and/or magenta patch dye amounts can be between 20 wt. % and 75 wt. % dye relative to the total dry weight of all components in the layer, for example, between 30 wt. % and 50 wt. %. A cyan patch dye amount can be between 40 wt. % and 90 wt. % dye relative to the total dry weight of all components in the layer, for example, between 55 wt. % and 75 wt. %.

To form each color patch of a dye-donor layer, one or more dyes can be dispersed in a polymeric binder. The binder can be used in an amount of from $0.05$ $g/m^2$ to $5$ $g/m^2$. The polymeric binder can be, for example, a polycarbonate; a poly(styrene-co-acrylonitrile); a poly(sulfone); a poly(phenylene oxide); a cellulose derivative such as but not limited to cellulose acetate hydrogen phthalate, cellulose acetate, cellulose acetate propionate, cellulose acetate butyrate, or cellulose triacetate; or a combination thereof.

The dye-donor layer can have a dye to binder ratio for each color dye patch. For example, a yellow dye to binder ratio can be from 0.3 to 1.2, or from 0.5 to 1.0. A magenta dye to binder ratio can be from 0.5 to 1.5, or from 0.8 to 1.2. A cyan dye to binder ratio can be from 1.0 to 2.5, or from 1.5 to 2.0.

The dye-donor layer of the dye-donor element can be formed or coated on a support. The dye-donor layer composition can be dissolved in a solvent for coating purposes. The dye-donor layer can be formed or coated on the support by techniques such as, but not limited to, a gravure process, spin-coating, solvent-coating, extrusion coating, or other methods known to practitioners in the art.

The support can be formed of any material capable of withstanding the heat of thermal printing. According to various embodiments, the support can be dimensionally stable during printing. Suitable materials can include polyesters, for example, poly(ethylene terephthalate) and poly(ethylene naphthalate); polyamides; polycarbonates; glassine paper; condenser paper; cellulose esters, for example, cellulose acetate; fluorine polymers, for example, poly(vinylidene fluoride) and poly(tetrafluoroethylene-co-hexafluoropropylene); polyethers, for example, polyoxymethylene; polyacetals; polystyrenes; polyolefins, for example, polyethylene, polypropylene, and methylpentane polymers; polyimides, for example, polyimide-amides and polyether-imides; and combinations thereof. The support can have a thickness of from 1 µm to 30 µm, for example, from 3 µm to 7 µm.

According to various embodiments, a subbing layer, for example, an adhesive or tie layer, a dye-barrier layer, or a combination thereof, can be coated between the support and the dye-donor layer. The subbing layer can be one or more layers. The adhesive or tie layer can adhere the dye-donor layer to the support. Suitable adhesives are known to practitioners in the art, for example, Tyzor TBT® from E.I. DuPont de Nemours and Company. The dye-barrier layer can include a hydrophilic polymer. The dye-barrier layer can provide improved dye transfer densities.

The dye-donor element can include a slip layer to reduce or prevent print head sticking to the dye-donor element. The slip layer can be coated on a side of the support opposite the dye-donor layer. The slip layer can include a lubricating material, for example, a surface-active agent, a liquid lubricant, a solid lubricant, or mixtures thereof, with or without a polymeric binder. Suitable lubricating materials can include oils or semi-crystalline organic solids that melt below 100° C., for example, poly(vinyl stearate), beeswax, perfluorinated alkyl ester polyether, poly(caprolactone), carbowax, polyethylene homopolymer, or poly(ethylene glycol). The lubricating material can also be a silicone- or siloxane-containing polymer. Suitable polymers can include graft copolymers, block polymers, copolymers, and polymer blends or mixtures. Suitable polymeric binders for the slip layer can include poly(vinyl alcohol-co-vinylbutyral), poly(vinyl alcohol-co-vinylacetal), polystyrene, poly(vinyl acetate), cellulose acetate butyrate, cellulose acetate, ethyl cellulose, and other binders as known to practitioners in the art. Examples of suitable slip layers can include those described, for example, in U.S. Patent Application Publications US2005/0009698A1, US2005/0009699A1, and US2005/0009700A1. The amount of lubricating material used in the slip layer is dependent, at least in part, upon the type of lubricating material, but can be in the range of from $0.001$ to $2$ $g/m^2$, although less or more lubricating material can be used as needed. If a polymeric binder is used, the lubricating material can be present in a range of 0.1 to 50 weight %, preferably 0.5 to 40 weight %, of the polymeric binder.

The dye-donor element can include a stick preventative agent to reduce or eliminate sticking between the dye-donor element and the receiver element during printing. The stick preventative agent can be present in any layer of the dye-donor element, so long as the stick preventative agent is capable of diffusing through the layers of the dye-donor element to the dye-donor layer, or transferring from the slip layer to the dye-donor layer. For example, the stick preventative agent can be present in one or more patches of the dye-donor layer, in the support, in an adhesive layer, in a dye-barrier layer, in a slip layer, or in a combination thereof. According to various embodiments, the stick preventative agent can be in the slip layer, the dye-donor layer, or both. According to various embodiments, the stick preventative agent is in the dye-donor layer. The stick preventative agent can be in one or more colored patches of the dye-donor layer, or a combination thereof. If more than one dye patch is present in the dye-donor layer, the stick preventative agent can be present in the last patch of the dye-donor layer to be printed, typically the cyan layer. However, the dye patches can be in any order. For example, if repeating patches of cyan, magenta, and yellow are used in the dye-donor element, in that respective order, the yellow patches, as the last patches printed in each series, can include the stick preventative agent. The stick preventative agent can be a silicone- or siloxane-containing polymer. Suitable polymers can include graft copolymers, block polymers, copolymers, and polymer blends or mixtures. Suitable stick preventative agents are described, for example, in U.S. Patent Application Publications US2005/0059550A1 and US2005/0059552A1.

Optionally, release agents as known to practitioners in the art can also be added to the dye-donor element, for example, to the dye-donor layer, the slip layer, or both. Suitable release agents can include, for example, those described in U.S. Pat. Nos. 4,740,496 and 5,763,358.

According to various embodiments, the dye-donor layer can contain no plasticizer. Inclusion of the plasticizer in the dye-donor layer can increase dye-donor efficiency. The dye-donor element can include plasticizers known in the art, such as those described in U.S. Pat. Nos. 5,830,824 and 5,750,465, and references disclosed therein. Suitable plasticizers can be defined as compounds having a glass transition temperature (Tg) less than 25° C., a melting point (Tm) less than 25° C., or both. Plasticizers useful for this invention can include low molecular weight plasticizers and higher molecular weight plasticizers such as oligomeric or polymeric plasticizers. Examples of suitable plasticizers can include aliphatic polyesters, epoxidized oils, chlorinated hydrocarbons, poly(ethylene glycols), poly(propylene glycols), and poly(vinyl ethyl ether) (PVEE). The molecular weight of the plasticizer can be greater than or equal to 450 to minimize transfer of the plasticizer to the dye-receiving layer during printing. The plasticizer can be present in an amount of from 1 to 50%, for example, from 5% to 35%, by weight of the binder.

Aliphatic polyesters suitable as plasticizers can be derived from succinic acid, glutaric acid, adipic acid, pimelic acid, suberic acid, azelaic acid, and sebacic acid. The aliphatic polyesters can have one or more functional end groups, for example a carboxyl, hydroxyl, or alkoxyl group, where each alkoxyl group can be from 1 to 18 carbon atoms. Examples of suitable aliphatic polyesters can include Drapex plasticizers (Crompton/Witco Corporation, Middlebury, Conn., USA), such as Drapex 429, and Admex plasticizers (Velsicol Chemical Corporation, Rosemont, Ill., USA) such as Admex 429, and Paraplex G25, Plasthall HA7A, Plasthall P650, Plasthall P-7092, all from CP Hall Company, Chicago, Ill., USA.

Epoxidized oils suitable as plasticizers can include partially or completely epoxidized natural oils, and partially or completely epoxidized derivatized natural oils such as epoxidized soybean oil sold as Paraplex G-60, Paraplex G-62, and Plasthall ESO; epoxidized linseed oil sold as Plasthall ELO; or epoxidized octyl tallate sold as Plasthall S-73, all from C. P. Hall Company.

Chlorinated hydrocarbons suitable for use as plasticizers can include long-chain hydrocarbons or paraffins consisting of methylene, methyl, methane or alkene groups, all of which can have a chlorine substitution. The length of the long-chain hydrocarbon can be between 8 and 30 carbon atoms, for example, between 12 and 24 carbon atoms. The chains can be branched. The amount of chlorine in the paraffin can be between 25 and 75 wt %, for example, between 40 and 70 wt %. Mixtures of chlorinated paraffins can also be used. According to certain embodiments, the chlorinated paraffins can have the formula $C_xH_yC_z$ wherein x is between 11 and 24, y is between 14 and 43, and z is between 3 and 10. Examples of suitable chlorinated hydrocarbons can include Chlorowax liquids sold by Occidental Chemical Corp., Dallas, Tex., USA, and Paroil paraffins sold by Dover Chemical Corp., Dover, Ohio, USA, such as Chlorowax 40 and Paroil 170HV.

Poly(ethylene glycols) and poly(propylene glycols) suitable for use as plasticizers can have unsubstituted end groups (OH), or they can be substituted with one or more functional groups such as an alkoxyl group or fatty acid, where each alkoxyl group or fatty acid can be from 1 to 18 carbon atoms. Examples of suitable poly(ethylene glycols) and poly(propylene glycols) can include TegMer 809 poly (ethylene glycol) from C. P. Hall Co., and PPG #483 poly(propylene glycol) from Scientific Polymer Products, Ontario, N.Y., USA.

The dye-donor layer can include beads. The beads can have a particle size of from 0.5 to 20 microns, preferably from 2.0 to 15 microns. The beads can act as spacer beads under the compression force of a wound up dye-donor roll, improving raw stock keeping of the dye-donor roll by reducing the material transferred from the dye-donor layer to the slipping layer, as measured by the change in sensitometry under accelerated aging conditions, or the appearance of unwanted dye in the laminate layer, or from the backside of the dye-donor element, for example, a slipping layer, to the dye-donor layer. The use of the beads can result in reduced mottle and improved image quality. The beads can be employed in any amount effective for the intended purpose. In general, good results have been obtained at a coverage of from 0.003 to 0.20 $g/m^2$. Beads suitable for the dye-donor layer can also be used in the slip layer.

The beads in the dye-donor layer can be crosslinked, elastomeric beads. The beads can have a glass transition temperature (Tg) of 45° C. or less, for example, 10° C. or less. The elastomeric beads can be made from an acrylic polymer or copolymer, such as butyl-, ethyl-, propyl-, hexyl-, 2-ethylhexyl-, 2-chloroethyl-, 4-chlorobutyl- or 2-ethoxyethyl-acrylate or methacrylate; acrylic acid; methacrylic acid; hydroxyethyl acrylate; a styrenic copolymer, such as styrene-butadiene, styrene-acrylonitrile-butadiene, styrene-isoprene, or hydrogenated styrene-butadiene; or mixtures thereof. The elastomeric beads can be crosslinked with various crosslinking agents, which can be part of the elastomeric copolymer, such as but not limited to divinylbenzene; ethylene glycol diacrylate; 1,4-cyclohexylene-bis (oxyethyl) dimethacrylate; 1,4-cyclohexylene-bis(oxypropyl) diacrylate; 1,4-cyclohexylene-bis(oxypropyl) dimethacrylate; and ethylene glycol dimethacrylate. The elastomeric beads can have from 1 to 40%, for example, from 5 to 40%, by weight of a crosslinking agent.

The beads in the dye-donor layer can be hard polymeric beads. Suitable beads can include divinylbenzene beads, beads of polystyrene crosslinked with at least 20 wt. % divinylbenzene, and beads of poly(methyl methacrylate) crosslinked with at least 20 wt. % divinylbenzene, ethylene glycol dimethacrylate, 1,4-cyclohexylene-bis(oxyethyl) dimethacrylate, 1,4-cyclohexylene-bis(oxypropyl) dimethacrylate, or other crosslinking monomers known to those familiar with the art.

The dye-donor element can be a sheet of one or more colored patches or laminate, or a continuous roll or ribbon. The continuous roll or ribbon can include one patch of a monochromatic color or laminate, or can have alternating areas of different patches, for example, one or more dye patches of cyan, magenta, yellow, or black, one or more laminate patches, or a combination thereof.

The receiver element suitable for use with the dye-donor element described herein can be any receiver element as known to practitioners in the art. For example, the receiver element can include a support having thereon a dye image-receiving layer. The support can be a transparent film. Transparent supports include cellulose derivatives, for example, a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; poly(vinyl alcohol-co-vinlyacetal); polyolefins, such as polyethylene or polypropylene; polysulfones; polyacrylates; polyetherimides; and mixtures thereof. Opaque supports can include plain paper, coated paper, synthetic paper, photographic paper support, melt-extrusion-coated paper, and laminated paper, such as biaxially oriented support laminates. Biaxially oriented support laminates suitable for use as receivers are described in U.S. Pat. Nos. 5,853, 965; 5,866,282; 5,874,205; 5,888,643; 5,888,681; 5,888, 683; and 5,888,714. Biaxially oriented supports can include a paper base and a biaxially oriented polyolefin sheet, for example, polypropylene, laminated to one or both sides of the paper base. The support can be a reflective paper, for example, baryta-coated paper, white polyester (polyester with white pigment incorporated therein), an ivory paper, a condenser paper, or a synthetic paper, for example, DuPont Tyvek® by E.I. DuPont de Nemours and Company, Wilmington, Del. The support can be employed at any desired thickness, for example, from 10 µm to 1000 µm. Exemplary supports for the dye image-receiving layer are disclosed in commonly assigned U.S. Pat. Nos. 5,244,861 and 5,928,990, and in EP-A-0671281. Other suitable supports as known to practitioners in the art can also be used. According to various embodiments, the support can be a composite or laminate structure comprising a base layer and one or more additional layers. The base layer can comprise more than one material, for example, a combination of one or more of a microvoided layer, a foamed layer, a nonvoided layer, a synthetic paper, a natural paper, and a polymer.

The dye image-receiving layer of the receiver element can be, for example, a polycarbonate, a polyurethane, a polyester, polyvinyl chloride, poly(styrene-co-acrylonitrile), poly(caprolactone), poly(vinyl chloride-co-vinyl acetate), poly(ethylene-co-vinyl acetate), polyvinylacetals such as polyvinylbutyral or polyvinylheptal, polymethacrylates including those described in U.S. Pat. No. 6,361,131, or combinations thereof. The dye image-receiving layer can be coated on the receiver element support in any amount effective for the intended purpose of receiving the dye from the dye-donor layer of the dye-donor element. For example, the dye image-receiving layer can be coated in an amount of from 1 g/m$^2$ to 5 g/m$^2$. Additional polymeric layers can be present between the support and the dye image-receiving layer. The additional layers can provide coloring, adhesion, antistat properties, act as a dye-barrier, act as a dye mordant layer, or a combination thereof. For example, a polyolefin such as polyethylene or polypropylene can be present. White pigments such as titanium dioxide, zinc oxide, and the like can be added to the polymeric layer to provide reflectivity. A subbing layer optionally can be used over the polymeric layer in order to improve adhesion to the dye image-receiving layer. This can be called an adhesive or tie layer. Exemplary subbing layers are disclosed in U.S. Pat. Nos. 4,748,150, 4,965,238, 4,965,239, and 4,965,241. An antistatic layer as known to practitioners in the art can also be used in the receiver element. The receiver element can also include a backing layer. Suitable examples of backing layers include those disclosed in U.S. Pat. Nos. 5,011,814 and 5,096,875.

The dye image-receiving layer, or an overcoat layer thereon, can contain a release agent, for example, a silicone or fluorine based compound, as is conventional in the art. Various exemplary release agents are disclosed, for example, in U.S. Pat. Nos. 4,820,687 and 4,695,286.

The receiver element can also include stick preventative agents, as described for the donor element. According to various embodiments, the receiver element and dye-donor element can include the same stick preventative agent.

The dye image-receiving layer can be formed on the support by any method known to practitioners in the art, including but not limited to printing, solution coating, dip coating, and extrusion coating. Wherein the dye image-receiving layer is extruded, the process can include (a) forming a melt comprising a thermoplastic material; (b) extruding or coextruding the melt as a single-layer film or a layer of a composite (multilayer or laminate) film; and (c) applying the extruded film to the support for the receiver element.

The dye-donor element and receiver element, when placed in superposed relationship such that the dye-donor layer of the dye-donor element is adjacent the dye image-receiving layer of the receiver element, can form a print assembly. An image can be formed by passing the print assembly past a print head, wherein the print head is located on the side of the dye-donor element opposite the receiver element. The print head can apply heat image-wise or patch-wise to the dye-donor element, causing the dyes or laminate in the dye-donor layer to transfer to the dye image-receiving layer of the receiver element.

Thermal print heads that can be used with the print assembly are available commercially and known to practitioners in the art. Exemplary thermal print heads can include, but are not limited to, a Fujitsu Thermal Head (FTP-040 MCSOO1), a TDK Thermal Head F415 HH7-1089, a Rohm Thermal Head KE 2008-F3, a Shinko head (TH300U162P-001), and Toshiba heads (TPH162R1 and TPH207R1A).

A magenta dye composition as described herein can exhibit one or more of improved light fade stability, improved keeping properties, or higher efficiency, providing images of sufficient density even at higher line speeds. Examples are herein provided to further illustrate the invention.

EXAMPLES

Materials used in the examples include the following: Aqualon N50 ethyl cellulose (48.0–49.5% ethoxyl content) polymeric binder from Hercules Chemical, Wilmington, Del., and Paraplex G25 polyester sebacate ($T_m$–20° C., $M_w$ 8000) from CP Hall Company.

Receiver

A receiver of the composition shown below was prepared, having an overall thickness of about 220 µm and a thermal dye receiver layer thickness of about 3 µm. It was prepared by solvent coating the subbing layer and dye receiving layer onto the prepared paper support. The receiver composition was the same for all examples.

---

4–8 µm divinyl benzene beads and solvent coated, cross-linked
polyol dye receiving layer
Subbing layer
Microvoided composite film OPPalyte 350 K18 (ExxonMobil)
Pigmented polyethylene
Cellulose Paper
Polyethylene
Polypropylene film

---

Yellow Donor Element:

A yellow dye-donor element for use in Example I was prepared by coating the following layers in the order recited on a first side of a 4.5 micron poly(ethylene terephthalate) support:

(1) a subbing layer of a titanium alkoxide (Tyzor TBT® from E.I DuPont de Nemours and Company) (0.16 g/m$^2$) from n-propyl acetate and n-butyl alcohol solvent mixture; and (2) a dye-donor layer containing a composition of yellow dyes illustrated below as follows: Yellow dye #1 at 0.0785 g/m$^2$ and Yellow dye #2 at 0.0978 g/m$^2$, aqualon N50 (Hercules Chemical, Wilmington, Del.) binder at 0.2283 g/m², and 2 micron divinyl benzene beads at 0.0037 g/m coated from a solvent mixture of 75 wt. % toluene, 20 wt. % methanol, and 5 wt. % cyclopentanone.

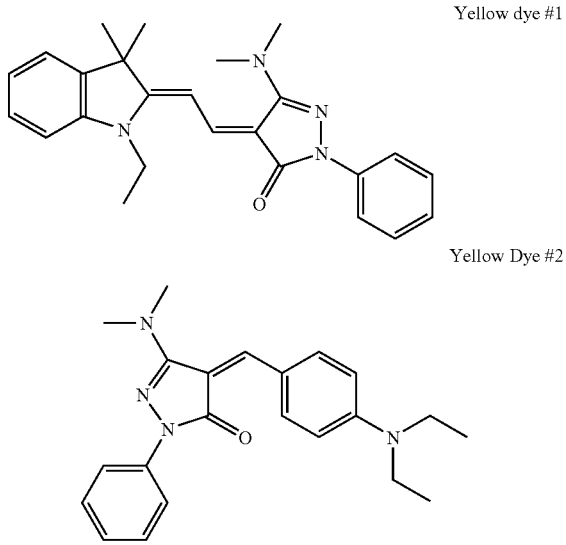

Yellow dye #1

Yellow Dye #2

On a second side of the support, a slipping layer was prepared by coating the following layers in the order recited:
(1) a subbing layer of a titanium alkoxide (Tyzor TBT®) (0.16 g/m²) from n-propyl acetate and n-butyl alcohol solvent mixture, and
(2) a slipping layer containing an ethene polymer of Polywax 400® (0.02 g/m²), a polyalphaolefin of Vybar 103® (0.02 g/m²), and a maleic anhydride copolymer of Ceremer 1608 (0.02 g/m²), all from Baker-Petrolite Polymers, Sugar Land, Tex., and a poly(vinyl acetal) binder (0.41 g/m²) (KS-1 from Sekisui, Japan) coated from a solvent mixture of 75 wt. % toluene, 20 wt. % methanol, and 5 wt. % cyclopentanone.

Laminate Layer:

A laminate donor element was prepared by coating on the back side of a 6 μm poly(ethylene terephthalate) support, in order:
1) a subbing layer of titanium alkoxide, Tyzor TBT®, (DuPont Corp.) (0.13 g/m²) from a n-propyl acetate and n-butyl alcohol solvent mixture (85/15), and
2) a slipping layer containing an aminopropyl-dimethyl-terminated polydimethylsiloxane, PS513® (United Chemical Technologies) (0.01 g/m²), a poly(vinyl acetal) binder, KS-1, (Sekisui Co.), (0.38 g/m²), p-toluenesulfonic acid (0.0003 g/m²) and candellila wax (0.02 g/m²) coated from a solvent mixture of 3-pentanone, methanol and distilled water (88.7/9.0/2.3).

On the front side of the element was coated a transferable overcoat layer containing colloidal silica, IPA-ST (Nissan Chemical Co.), at a laydown of 0.46 g/m², Tinuvin 460® (Ciba Specialty Chemicals), a UV-absorbing triazine, at a laydown of 0.11 g/m², poly(vinyl acetal), KS-10, (Sekisui Co.), at a laydown of 0.63 g/m², and 4 μm divinylbenzene beads at a laydown of 0.11 g/m². The materials were dissolved and coated from the solvent 3-pentanone. The laminate composition was the same for all examples.

Example I

Dye-donor Element I-1

A magenta dye-donor element was prepared by coating the following layers in the order recited on a first side of a 4.5 micron poly(ethylene terephthalate) support:
(1) a subbing layer of a titanium alkoxide (Tyzor TBT® from E.I DuPont de Nemours and Company) (0.16 g/m²) from n-propyl acetate and n-butyl alcohol solvent mixture; and
(2) a dye-donor layer containing a composition of the magenta dyes illustrated below as follows: magenta dye structure Ib at 0.042 g/m² and magenta dye structure IIa at 0.239 g/m²; Aqualon N50 at 0.297 g/m²; plasticizer Paraplex G25 at 0.059 g/m²; and divinyl benzene beads at 0.0054 g/m² coated from a solvent mixture of 75 wt. % toluene, 20 wt. % methanol, and 5 wt. % cyclopentanone.

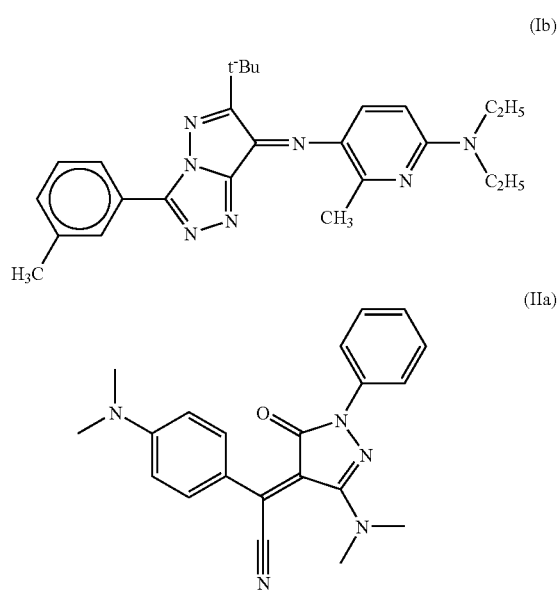

(Ib)

(IIa)

On a second side of the support, a slipping layer was prepared by coating the following layers in the order recited:
(1) a subbing layer of a titanium alkoxide (Tyzor TBT®) (0.16 g/m²) from n-propyl acetate and n-butyl alcohol solvent mixture, and
(2) a slipping layer containing an ethene polymer of Polywax 400® (0.02 g/m²), a polyalphaolefin of Vybar 103® (0.02 g/m²), and a maleic anhydride copolymer of Ceremer 1608 (0.02 g/m²), all from Baker-Petrolite Polymers, Sugar Land, Tex., and a poly(vinyl acetal) binder (0.41 g/m²) (KS-1 from Sekisui, Japan) coated from a solvent mixture of 75 wt. % toluene, 20 wt. % methanol, and 5 wt. % cyclopentanone.

Dye-donor Elements I-2 through I-6 and comparative elements C-1 and C-2

Dye-donor elements I-2 through I-6 and dye-donor comparative elements C-1 and C-2 were prepared the same as dye-donor element I-1, except that the magenta dye composition of the dye-donor layer was varied as shown in Table 1.

TABLE 1

| Element | Magenta Dye IIa (g/m$^2$) | Magenta Dye Ib (g/m$^2$) | Wt. Ratio IIa/Ib |
|---|---|---|---|
| I-1 | 0.239 | 0.042 | 85:15 |
| I-2 | 0.210 | 0.070 | 75:25 |
| I-3 | 0.140 | 0.140 | 50:50 |
| I-4 | 0.070 | 0.210 | 25:75 |
| I-5 | 0.042 | 0.239 | 15:85 |
| I-6 | 0.028 | 0.253 | 10:90 |
| C-1 | 0.281 | 0.000 | 100:0 |
| C-2 | 0.000 | 0.281 | 0:100 |

Procedure

A 15-step patch image of optical density (OD) ranging from $D_{min}$ (OD<0.2) to $D_{max}$ (OD>2.0) was printed for evaluation. When printed using 1.007 msec/line and a resistive head voltage of 25.0 V, this is equivalent to equal energy increments ranging from a print energy of 0 Joules/Cm$^2$ to a print energy of 1.449 Joules/cm$^2$. Printing was done manually as described below.

The dye side of the dye-donor element was placed in contact with the dye image-receiving layer of the receiver element of the same width to form a print assembly. The print assembly was fastened to a stepper motor-driven pulling device. The imaging electronics were activated, causing the pulling device to draw the print assembly between the print head and a roller at a rate of about 80 mm/sec. The printing line time was 1.007 msec/line. After each print, the dye-donor element and receiver element were separated manually. The process was repeated for printing each of a yellow, magenta, cyan, and laminate patch on the same receiver to form monochrome, bi-chrome, and neutral color patches, as known in the art. The Status A red reflection density of each printed monochrome magenta and bi-chrome red (combination of yellow and magenta) patch of the final print 15-step patch image on the receiver was measured using a Status A green filter with an X-rite Model 820 Reflection Densitometer.

The printed images were subjected to High-Intensity Daylight fading for 21 days at 50 Klux, 5400 K light using a Xenon light source, at 32° C. and approximately 25% RH, after which the status A densities were read. The percent density loss after fade was calculated from a step with an initial density of approximately 1.0. The results of the simulated daylight fade testing are shown in Table 2.

TABLE 2

| Print | % Loss in density of the Magenta Monochrome patch | % Loss in density of Red Bichrome patch |
|---|---|---|
| C-1 | 19 | 29 |
| C-2 | 20 | 31 |
| I-1 | 18 | 27 |
| I-2 | 18 | 26 |
| I-3 | 17 | 27 |
| I-4 | 17 | 27 |
| I-5 | 16 | 28 |
| I-6 | 17 | 27 |

As can be seen from the data in Table 2, the prints made from inventive donor elements show improved, that is, less, light fade than the comparative examples.

Example II

Dye-donor Element II-1

A dye-donor element was prepared by coating the following layers in the order recited on a first side of a 4.5 micron poly(ethylene terephthalate) support:

(1) a subbing layer of a titanium alkoxide (Tyzor TBT®) from E.I DuPont de Nemours and Company) (0.16 g/m$^2$) from n-propyl acetate and n-butyl alcohol solvent mixture; and (2) a dye-donor layer containing a composition of the magenta dyes illustrated below as follows: magenta dye structure Ib at 0.136 g/m$^2$, magenta dye structure IIa at 0.045 g/m$^2$, and magenta dye structure IVa at 0.045 g/m$^2$; Aqualon N50 at 0.297 g/m$^2$; plasticizer Paraplex G25 at 0.059 g/m$^2$; and divinyl benzene beads at 0.0054 g/m$^2$ coated from a solvent mixture of 75 wt. % toluene, 20 wt. % methanol, and 5 wt. % cyclopentanone.

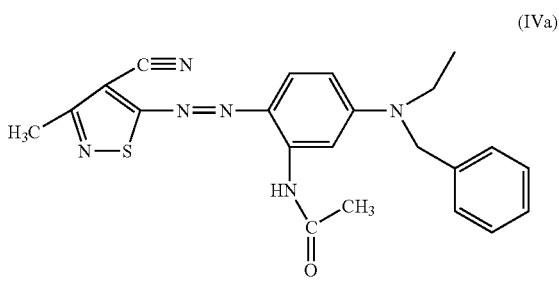

(IVa)

On a second side of the support, a slipping layer was prepared by coating the following layers in the order recited:

(1) a subbing layer of a titanium alkoxide (Tyzor TBT®) (0.16 g/m2) from n-propyl acetate and n-butyl alcohol solvent mixture, and (2) a slipping layer containing an ethene polymer of Polywax 400® (0.02 g/m$^2$), a polyalphaolefin of Vybar 103® (0.02 g/m$^2$), and a maleic anhydride copolymer of Ceremer 1608 (0.02 g/m$^2$), all from Baker-Petrolite Polymers, Sugar Land, Tex., and a poly(vinyl acetal) binder (0.41 g/m$^2$) (KS-1 from Sekisui, Japan) coated from a solvent mixture of 75 wt. % toluene, 20 wt. % methanol, and 5 wt. % cyclopentanone.

Dye-donor Elements II-2 and comparative elements C-3 and C-4

Dye-donor element II-2 and dye-donor comparative elements C-3 and C-4 were prepared the same as dye-donor element II-1, except that the magenta dye composition of the dye-donor layer was varied as shown in Table 3, and could include Structure IIIA as follows:

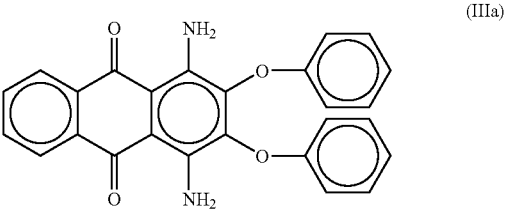

(IIIa)

TABLE 3

| Element | Magenta Dye Ib (g/m$^2$) | Magenta Dye IIa (g/m$^2$) | Magenta Dye IIIa (g/m$^2$) | Magenta Dye IVa (g/m$^2$) |
|---|---|---|---|---|
| II-1 | 0.136 | 0.045 | 0 | 0.045 |
| II-2 | 0.168 | 0.056 | 0 | 0.056 |
| C-3 | 0.136 | 0.045 | 0.045 | 0 |
| C-4 | 0.168 | 0.056 | 0.056 | 0 |

Procedure

A 15-step patch image was printed as described in Example I. The Status A red reflection density of each printed monochrome magenta step of the final print 15-step patch image was measured using a Status A green filter with an X-rite Model 820 Reflection Densitometer. The green densities of the Dmax steps of these prints are given in Table 4.

TABLE 4

| Print | Dmax Status A Green density |
|---|---|
| C-3 | 2.089 |
| C-4 | 2.290 |
| II-1 | 2.316 |
| II-2 | 2.504 |

As can be seen from the data in Table 4, the donor elements containing the inventive examples are more efficient, resulting in higher Dmaxes under the same printing conditions as the comparative examples.

Example III

Samples 1–16 were prepared as indicated above for Examples I-1 and II-1, but with the dye compositions and dye/binder ratios shown in Table 5. For each sample, accelerated keeping was performed, wherein each dye donor was kept at 60° C. with constant ambient humidity of 40–50% RH for 3 days. Each sample was then checked visually, and by printing, to determine if any crystallization of the dye mixture had occurred. The amount of crystallization of each dye donor sample is shown in Table 5.

TABLE 5

| Print | Dye Ib mg/ft2/ (% total dye) | Dye IIa mg/ft2/ (% total dye) | Dye IIIa mg/ft2/ (% total dye) | Dye IVa mg/ft2/ (% total dye) | Dye:Binder Ratio | Crystal Formation |
|---|---|---|---|---|---|---|
| 1 | 6.39/(32) | | 7.66/(38) | 5.96 (30) | 0.9 | None |
| 2 | 5.75/(32) | | 6.89/(38) | 5.36 (30) | 0.81 | None |
| 3 | 5.11/(32) | | 6.12/(38) | 4.76 (30) | 0.72 | None |
| 4 | 15.78/(75) | 5.26/(25) | | | 0.95 | Severe |
| 5 | 17.88/(85) | 3.16/(15) | | | 0.95 | Severe |
| 6 | 18.94/(90) | 2.1/(10) | | | 0.95 | Severe |
| 7 | 16.83/(80) | 4.21/(20) | | | 0.95 | Severe |
| 8 | 17.36/(82.5) | 3.68/(17.5) | | | 0.95 | Severe |
| 9 | 14.2/(67.5) | 4.73/(22.5) | 2.1/(10) | | 0.95 | Severe |
| 10 | 12.62/(60) | 4.21/(20) | 4.21/(20) | | 0.95 | None |
| 11 | 11.05/(52.5) | 3.68/(17.5) | 6.31/(30) | | 0.95 | None |
| 12 | 16.1/(76.5) | 2.84/(13.5) | 2.1/(10) | | 0.95 | Severe |
| 13 | 14.31/(68) | 2.52/(12) | 4.21/(20) | | 0.95 | None |
| 14 | 12.52/(59.5) | 2.21/(10.5) | 6.31/(30) | | 0.95 | None |
| 15 | 17.04/(81) | 1.89/(9) | 2.1/(10) | | 0.95 | Severe |
| 16 | 15.15/(72) | 1.68/(8) | 4.21/(20) | | 0.95 | None |

As shown in Table 5, under accelerated keeping conditions, the magenta donors containing three dyes performed better than those containing only two dyes.

We claim:

1. A magenta dye combination comprising at least a first magenta dye of the following structure I:

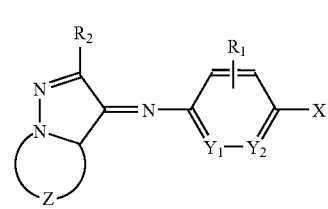

(I)

wherein X is a NR$_3$R$_4$ group or a hydroxyl group, wherein R$_3$ and R$_4$ may be same or different and are independently selected from an alkyl, alkenyl, aryl, aralkyl, or cycloalkyl group; Y$_1$ and Y$_2$ each independently are selected from a carbon atom or a nitrogen atom, provided that one of Y$_1$ and Y$_2$ is a nitrogen atom; Z is an atomic group necessary to form a 5- or 6-membered nitrogen-containing heterocyclic ring which may be condensed with another ring; and R$_1$ and R$_2$ are each independently selected from a hydrogen atom, halogen atom, alkyl, alkenyl, alkoxy, alkylamino, acetamido, sulfonamide, aryl, aralkyl, or cycloalkyl group;

and a second magenta dye of the structure II:

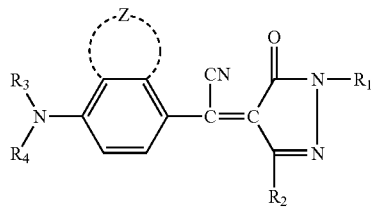

(II)

wherein:
- R₁ represents an alkyl group having from 1 to 10 carbon atoms, a cycloalkyl group having from 5 to 7 carbon atoms, or an aryl group having from 6 to 10 carbon atoms;
- R₂ represents an alkoxy group having from 1 to 10 carbon atoms, an aryloxy group having from 6 to 10 carbon atoms, naphthoxy, NHR₅ or NR₅R₆;
- R₃ and R₄ are each independently R₁, or either or both of R₃ and R₄ can be joined to the carbon atom of the aromatic ring at a position ortho to the position of attachment of the anilino nitrogen to form a 5- or 6-membered ring, or R₃ and R₄ can be joined together to form a 5- or 6-membered heterocyclic ring with the nitrogen to which they are attached;
- R₅ and R₆ each independently represents an alkyl group having from 1 to 10 carbon atoms, a cycloalkyl group having from 5 to 7 carbon atoms, or an aryl group having from 6 to 10 carbon atoms, or R₅ and R₆ may be joined together to form, along with the nitrogen to which they are attached, a 5- or 6-membered heterocyclic ring; and
- Z represents hydrogen or the atoms necessary to complete a 5- or 6-membered ring.

2. The combination of claim 1 wherein structure I is as follows:

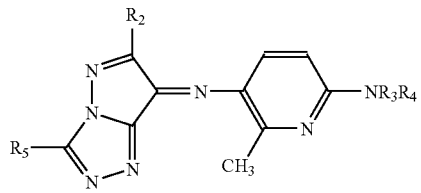

(Ia)

wherein R₃ and R₄ can be the same or different and are independently selected from an alkyl and an alkenyl; R₂ can be a C₁₋₆ alkyl; and R₅ can be a C₁₋₁₀ alkyl group, a C₅₋₇ cycloalkyl group, or a C₆₋₁₀ aryl group.

3. The combination of claim 1 wherein structure I is as follows:

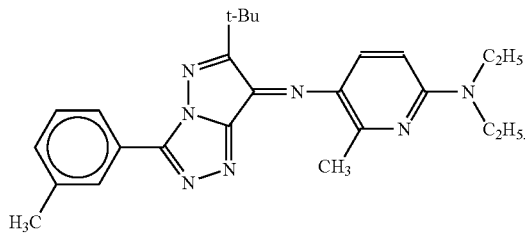

(Ib)

4. The combination of claim 1 wherein R¹ of structure II is phenyl or methyl.

5. The combination claim 1 wherein R³ and R⁴ of structure II are each independently selected from methyl or ethyl.

6. The combination of claim 1 wherein R² of structure II is NR⁵R⁶, wherein each of R⁵ and R⁶ is independently selected from methyl or ethyl.

7. The combination of claim 1, wherein structure II is as follows:

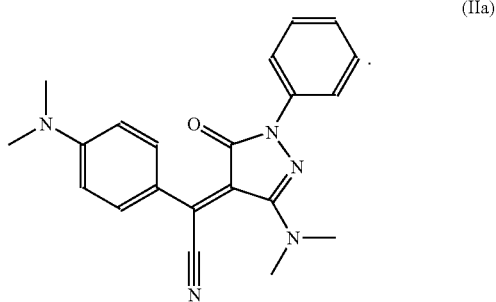

(IIa)

8. The magenta dye combination of claim 1, having improved light fade as compared to either the first or second magenta dye alone.

9. The magenta dye combination of claim 1, further including a third magenta dye.

10. The magenta dye combination of claim 9, wherein the third magenta dye has the following structure III:

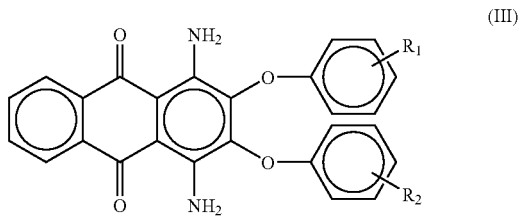

(III)

wherein R₁ and R₂ are each independently selected from hydrogen, hydroxyl, halogen, C₁₋₄ alkyl, or C₁₋₄ alkoxy.

11. The magenta dye combination of claim 10, wherein the third magenta dye has the following structure III:

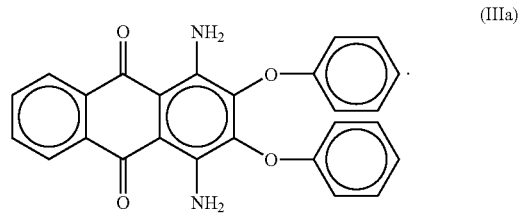

(IIIa)

12. The magenta dye combination of claim 9, wherein the third magenta dye has the following structure IV:

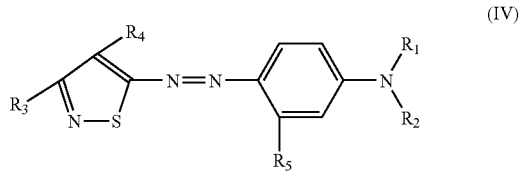

(IV)

wherein R₁ and R₂ are each independently hydrogen, C₁₋₆ alkyl or allyl, C₅₋₇ cycloalkyl, C₅₋₁₀ aryl, or R₁ and R₂ can be taken together to form a 5- or 6-membered heterocyclic ring which can include the nitrogen to which $R_1$ or $R_2$ is attached, and either carbon atom ortho to the carbon attached to the nitrogen atom;

$R_3$ is a hydrogen, $C_{1-6}$ alkyl, $C_{5-10}$ aryl, alkylthio, or halogen;

$R_4$ is cyano, thiocyanato, alkylthio, or alkoxycarbonyl; and $R_5$ is a $C_{1-6}$ alkyl, a $C_{5-10}$ aryl, or NHA, where A is an acyl or sulfonyl radical.

13. The magenta dye combination of claim 12, wherein the third magenta dye has the following structure IV:

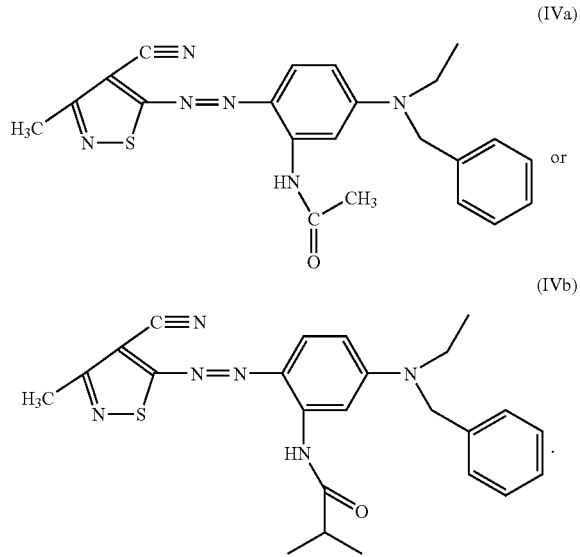

14. A thermal dye-donor element comprising a base layer and a dye-donor layer, wherein the dye-donor layer comprises the magenta dye combination of claim 1.

15. The thermal dye-donor element of claim 14, further comprising a yellow dye-donor patch and a cyan dye-donor patch.

16. The thermal dye-donor element of claim 14, further comprising a laminate patch.

17. A process of forming an image, comprising obtaining the dye-donor element of claim 14, superposing the dye-donor element with a dye-receiving element such that the dye-donor layer faces a dye-receiving layer of the dye-receiving element, and applying heat in an imagewise fashion to the dye-donor element to transfer at least a portion of the magenta dye combination from the dye-donor layer to the dye-receiving layer.

18. A thermal dye-donor element comprising a base layer and a dye-donor layer, wherein the dye-donor layer comprises the magenta dye combination of claim 11.

19. The thermal dye-donor element of claim 18, further comprising a yellow dye-donor patch and a cyan dye-donor patch.

20. The thermal dye-donor element of claim 18, further comprising a laminate patch.

21. A process of forming an image, comprising obtaining the dye-donor element of claim 18, superposing the dye-donor element with a dye-receiving element such that the dye-donor layer faces a dye-receiving layer of the dye-receiving element, and applying heat in an imagewise fashion to the dye-donor element to transfer at least a portion of the magenta dye combination from the dye-donor layer to the dye-receiving layer.

22. A thermal dye-donor element comprising a base layer and a dye-donor layer, wherein the dye-donor layer comprises the magenta dye combination of claim 13.

23. The thermal dye-donor element of claim 22, further comprising a yellow dye-donor patch and a cyan dye-donor patch.

24. The thermal dye-donor element of claim 22, further comprising a laminate patch.

25. A process of forming an image, comprising obtaining the dye-donor element of claim 22, superposing the dye-donor element with a dye-receiving element such that the dye-donor layer faces a dye-receiving layer of the dye-receiving element, and applying heat in an imagewise fashion to the dye-donor element to transfer at least a portion of the magenta dye combination from the dye-donor layer to the dye-receiving layer.

* * * * *